April 22, 1924.

H. T. DONNELL 1,491,683

PRESSURE GAUGE FOR AUTOMOBILE TIRES

Filed May 22, 1922

Henry T. Donnell, INVENTOR.

BY Geo. P. Kimmel, ATTORNEY.

Patented Apr. 22, 1924.

1,491,683

UNITED STATES PATENT OFFICE.

HENRY T. DONNELL, OF WASHINGTON, DISTRICT OF COLUMBIA.

PRESSURE GAUGE FOR AUTOMBILE TIRES.

Application filed May 22, 1922. Serial No. 562,657.

*To all whom it may concern:*

Be it known that I, HENRY T. DONNELL, a citizen of the United States, residing at Washington, in the District of Columbia, have invented certain new and useful Improvements in Pressure Gauges for Automobile Tires, of which the following is a specification.

This invention has reference to improvements in pressure gauges for automobile tires and its object is to provide a pressure gauge whereby an automobile tire may be pumped to a predetermined pressure without attention and when such pressure is reached, additional air directed to the tire will simply escape to the atmosphere.

In accordance with the invention, there is provided a cylinder or body member with a hose nipple or connection leading to the usual pump or other source of air under pressure.

Furthermore, the interior of the body member or cylinder is provided with means for the attachment of the gauge to the tire to be inflated.

Within the cylinder there is lodged a spring controlled valve, remaining closed until the predetermined pressure is obtained, and then opening for the escape of surplus air to the atmosphere.

In order to determine the escape or blow-off of the air pressure, there is provided a screw stem engaging the spring to compress it more or less, and this stem is under the control of a graduated head having a changeable stop pin which may be allowed to engage an adjustable pointer or index finger to determine the blow-off point, whereby the pressure pumped into the tire may at no time exceed the predetermined pressure decided upon, the operation being entirely automatic.

The invention will be best understood from a consideration of the following detailed description taken in connection with the accompanying drawing forming part of this specification, with the understanding that the invention is not confined to any strict conformity with the showing of the drawing, but may be changed and modified so long as such changes and modifications mark no material departure from the salient features of the invention as expressed in the appended claim.

In the drawing:—

Figure 1:
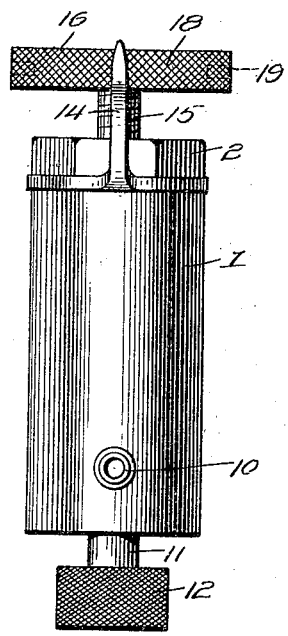
Figure 1 is a face view of the tire gauge.
Figure 2:
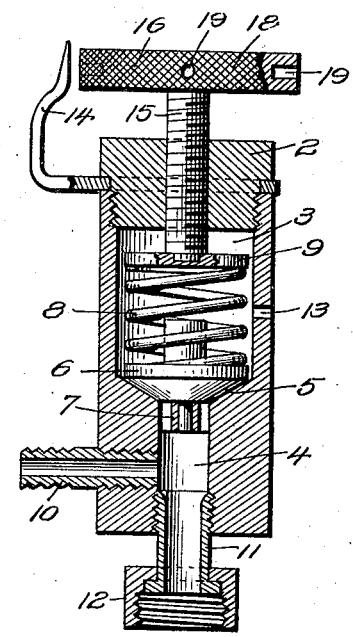
Fig. 2 is a longitudinal central section of the tire gauge.
Figure 3:
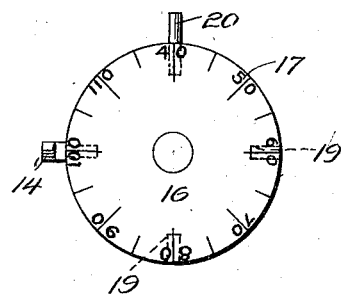
Fig. 3 is a plan view of the tire gauge showing the manipulating head only.

Referring to the drawings, there is shown a cylinder or barrel 1 of suitable size and shape, which cylinder is provided at one end with a closure or head 2 and is also provided with an intermediate chamber 3, the other end of the cylinder being contracted in internal diameter to provide a bore 4, the contracted portion including a valve seat 5 and enclosing a valve 6 of customary construction. The valve 6 is provided with the usual centering and guiding stem 7 against which is seated one end of an extension spring 8, the other end of the spring engaging against a plate 9.

Extending through the walls of the body 1 is a hose connection 10 of customary construction for the attachment of a hose leading from a source of air under pressure, such as pump, but which pump is not shown in the drawing.

Axially entering the bore 4 is a nipple 11 carrying a swivel nut 12 by means of which the gauge may be attached to the tire nipple of the outfit.

The interior chamber 3 of the body member 1 is provided at a convenient point with a vent opening 13, whereby air in excess pumped into the body 1 may escape.

The closure or head 2 is in the form of a nut entering the chamber 3 and anchors a ring-shaped pointer or index finger 14.

Threaded through the nut or closure 2 is a screw threaded stem 15 carrying a disk-shaped head 16 on the upper surface of which is provided a circular series of graduations 17 representing multiples of pressure in pounds.

The rim of the disk 16 is milled as shown at 18 or shaped to provide a firm grip to the fingers of the operator.

Radially entering the periphery of the disk 16 are sockets 19 each of which is designed to receive a pin 20, such sockets being arranged about the periphery of the disk at predetermined intervals which have been found by experience to be the most useful.

The pointer 14 is so related to the disk 16 as to extend beyond it.

In operating the device, a pin 20 is introduced into the socket at the desired point where the gauge is to discharge, whereupon on reaching such point the gauge will no longer accumulate air.

What is claimed is:—

An automatic valve gauge for automobile tires comprising a body member having a vent to the atmosphere, a plug closing one end of the body member, a spring controlled valve in the body member, an adjusting screw with a manipulating head to regulate the valve, said head having a circular series of radial sockets, a stop pin adapted to be held in any one of the sockets, and a pointer or index finger clamped between the body member and the plug and adjustable circularly thereof to determine the point about the axis of the adjusting screw at which the index finger and stop pin will meet.

In testimony whereof, I affix my signature hereto.

HENRY T. DONNELL.